United States Patent
Fobean

(10) Patent No.: US 7,357,206 B2
(45) Date of Patent: Apr. 15, 2008

(54) CHILD'S RIDING VEHICLE

(75) Inventor: Eric Fobean, Stow, OH (US)

(73) Assignee: The Little Tikes Company, Hudson, OH (US)

( * ) Notice: Subject to any disclaimer, the term of this patent is extended or adjusted under 35 U.S.C. 154(b) by 4 days.

(21) Appl. No.: 11/103,036

(22) Filed: Apr. 11, 2005

(65) Prior Publication Data

US 2006/0225932 A1 Oct. 12, 2006

Related U.S. Application Data

(60) Provisional application No. 60/668,892, filed on Apr. 6, 2005.

(51) Int. Cl.
*B60R 16/04* (2006.01)

(52) U.S. Cl. ............... 180/68.5; 224/42.4; 224/42.38; 248/503

(58) Field of Classification Search ............... 180/68.5; 248/503, 500, 510, 505, 507, 509, 221.12, 248/222.51, 222.52; 224/42.38, 42.4; 403/330, 403/323, 316, 318; 211/192
See application file for complete search history.

(56) References Cited

U.S. PATENT DOCUMENTS

| | | | | |
|---|---|---|---|---|
| 1,469,595 A | * | 10/1923 | Hick .......................... | 180/68.5 |
| 2,236,627 A | * | 4/1941 | McWhirter ................. | 403/330 |
| 2,522,215 A | * | 9/1950 | Du Shane ................... | 280/515 |
| 3,165,163 A | * | 1/1965 | Holka ........................ | 180/68.5 |
| 3,392,848 A | * | 7/1968 | McConnell et al. ........ | 211/192 |
| 5,052,198 A | * | 10/1991 | Watts .......................... | 70/58 |
| 5,193,879 A | | 3/1993 | Chen ........................... | 296/177 |
| 5,222,711 A | * | 6/1993 | Bell ............................. | 248/503 |
| 5,307,890 A | | 5/1994 | Huang ........................ | 180/65.1 |
| 5,434,494 A | | 7/1995 | Perego ........................ | 320/2 |
| 5,644,114 A | | 7/1997 | Neaves ........................ | 200/6 |
| 5,791,502 A | * | 8/1998 | Bietz et al. ................. | 211/192 |
| 5,845,724 A | | 12/1998 | Barrett ....................... | 180/65.1 |
| 5,859,509 A | | 1/1999 | Bienz et al. ................ | 318/139 |
| 5,947,739 A | | 9/1999 | Lenihan ...................... | 434/29 |
| 6,095,268 A | | 8/2000 | Jones, Jr. ................... | 180/6.5 |
| 6,105,982 A | | 8/2000 | Howell et al. ............. | 280/91.1 |
| 6,142,435 A | * | 11/2000 | Lodi .......................... | 248/222.41 |
| 6,179,331 B1 | | 1/2001 | Jones, Jr. et al. .......... | 280/827 |
| 6,186,256 B1 | * | 2/2001 | Dignitti ..................... | 180/68.5 |
| 6,347,679 B1 | | 2/2002 | Dignitti et al. ............ | 180/68.5 |
| 6,377,026 B1 | | 4/2002 | Crofut et al. ............... | 320/134 |
| 6,412,787 B1 | | 7/2002 | Pardi et al. ................. | 280/1.202 |
| 6,422,330 B1 | | 7/2002 | Harris ........................ | 180/65.1 |
| 6,470,982 B2 | | 10/2002 | Sitarski et al. ............. | 180/65.1 |

(Continued)

*Primary Examiner*—Christopher P. Ellis
*Assistant Examiner*—John D Walters
(74) *Attorney, Agent, or Firm*—Renner, Otto, Boisselle & Sklar, LLP

(57) ABSTRACT

A battery retainer assembly (42) is provided for retaining a battery package (18) in a storage location (20) on a child's riding vehicle. The battery retainer assembly (42) comprises a clamp (44) and a separate locking tab (46). The clamp (44) is movable relative to the vehicle body (12) between a clamped condition whereat it clamps the battery package (18) in the storage location (20) and a released condition whereat it allows removal of the battery package (18) from the storage location (20). The locking tab (46) is movable relative to the vehicle body (12) between a locked position whereat it locks the clamp (44) in the clamping position and an unlocked position whereat it allows the clamp (44) to be moved to the released condition.

20 Claims, 4 Drawing Sheets

U.S. PATENT DOCUMENTS

| | | | |
|---|---|---|---|
| 6,508,320 B2 | 1/2003 | Huntsberger et al. | 180/65.1 |
| 6,508,322 B2 | 1/2003 | Dignitti et al. | 180/68.5 |
| 6,509,719 B2 | 1/2003 | Crofut et al. | 320/134 |
| 6,656,010 B1 | 12/2003 | Bienz et al. | 446/431 |
| 6,755,265 B2 | 6/2004 | Huntsberger et al. | 180/65.1 |
| 6,771,034 B2 | 8/2004 | Reile et al. | 318/139 |
| 6,827,169 B1 * | 12/2004 | Van Hout et al. | 180/68.5 |
| 2002/0066609 A1 | 6/2002 | Dignitti et al. | 180/68.5 |
| 2002/0068499 A1 | 6/2002 | Huntsberger et al. | 446/93 |
| 2002/0104695 A1 | 8/2002 | Sitarski et al. | 180/65.1 |
| 2002/0105182 A1 | 8/2002 | Huntsberger et al. | 280/827 |
| 2002/0109480 A1 | 8/2002 | Crofut et al. | 320/107 |
| 2002/0113564 A1 | 8/2002 | Reile et al. | 318/139 |
| 2002/0157886 A1 * | 10/2002 | Iwase | 180/68.5 |
| 2002/0163141 A1 | 11/2002 | Pardi et al. | 280/1.202 |
| 2005/0034904 A1 | 2/2005 | Huntsberger et al. | 180/65.1 |
| 2005/0056473 A1 | 3/2005 | Damon | 180/68.5 |
| 2005/0056474 A1 | 3/2005 | Damon | 180/68.5 |

* cited by examiner

CHILD'S RIDING VEHICLE

RELATED APPLICATION

This application claims priority under 35 U.S.C. §119(e) to U.S. Provisional Patent Application No. 60/668,892 filed on Apr. 6, 2005.

FIELD OF THE INVENTION

This invention relates generally to a child's riding vehicle and, more particularly, to a riding vehicle for a child that includes a battery for powering a driving assembly and/or other battery-powered components.

BACKGROUND OF THE INVENTION

Children enjoy mimicking adult behavior and the driving of vehicles is certainly no exception. For this reason, riding vehicles, and especially those modeled after automotive vehicles driven by adults, are appealing to children. A child's riding vehicle will typically comprise a vehicle body adapted to carry at least one child, wheels coupled to the vehicle body, and a motor drivingly coupled to the wheels. While the motor in an adult automotive vehicle is normally powered by an internal combustion engine, a child's riding vehicle usually includes a battery package to power the motor. The battery package is situated in a storage location on the vehicle body (e.g., an under-the-hood compartment), this storage location preferably being easily accessible by an adult for removal of the battery for recharging and/or replacement purposes.

SUMMARY OF THE INVENTION

A child's riding vehicle is provided wherein a battery retainer assembly adequately holds a battery package in its storage location while a child is driving the vehicle and also allows convenient access/removal of the battery package by a supervising adult.

More particularly, a child's riding vehicle is provided which comprises a vehicle body adapted to carry a child, wheels coupled to the vehicle body, a motor drivingly coupled to the wheels, a battery package for powering the motor, and a battery retainer assembly which retains the battery in a storage location on the vehicle body. The battery retainer assembly comprises a clamp and a separate locking tab. The clamp is movable relative to the vehicle body between a clamped condition whereat it clamps the battery in the storage location and a released condition whereat it allows removal of the battery from the storage location. The locking tab is movable relative to the vehicle body between a locked position whereat it locks the clamp in the clamping position and an unlocked position whereat it allows the clamp to be moved to the released condition.

These and other features of the invention are fully described and particularly pointed out in the claims. The following description and annexed drawings set forth in detail a certain illustrative embodiment of the invention, this embodiment being indicative of but one of the various ways in which the principles of the invention may be employed.

DRAWINGS

DETAILED DESCRIPTION

Figure 1:
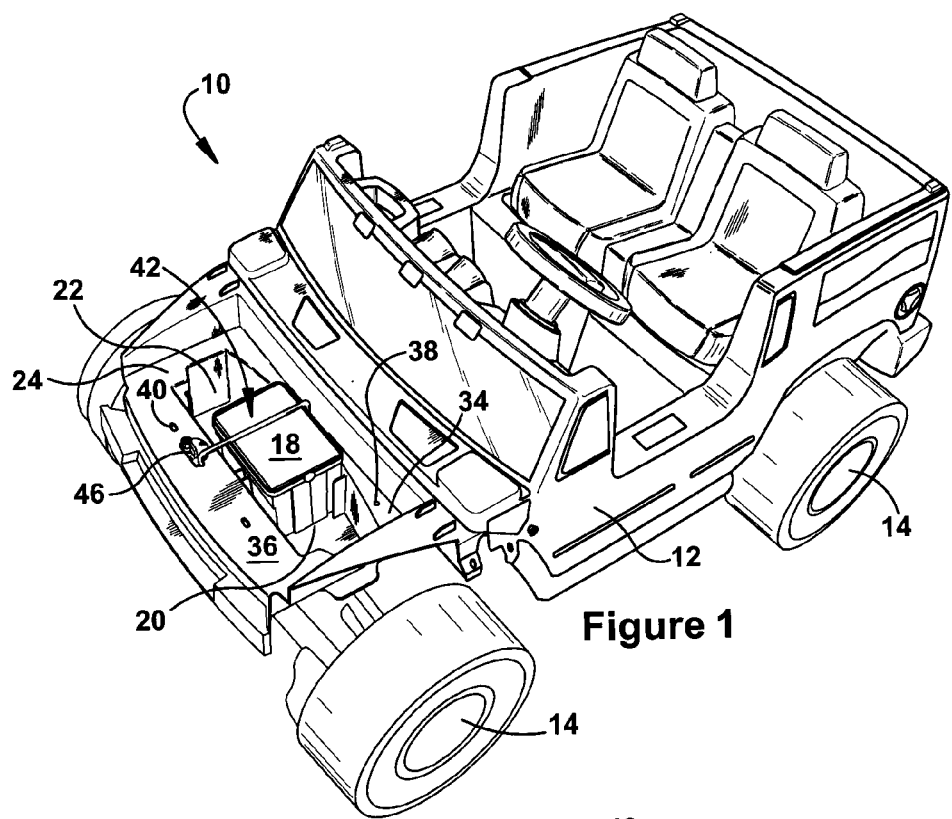
FIG. 1 is a perspective view of child's riding vehicle, the vehicle being shown with its hood removed so that an under-the-hood region of the vehicle is visible in the drawing, this under-the-hood region including a compartment, a battery package within a storage location of the compartment, and a battery retainer assembly.
Figure 2:
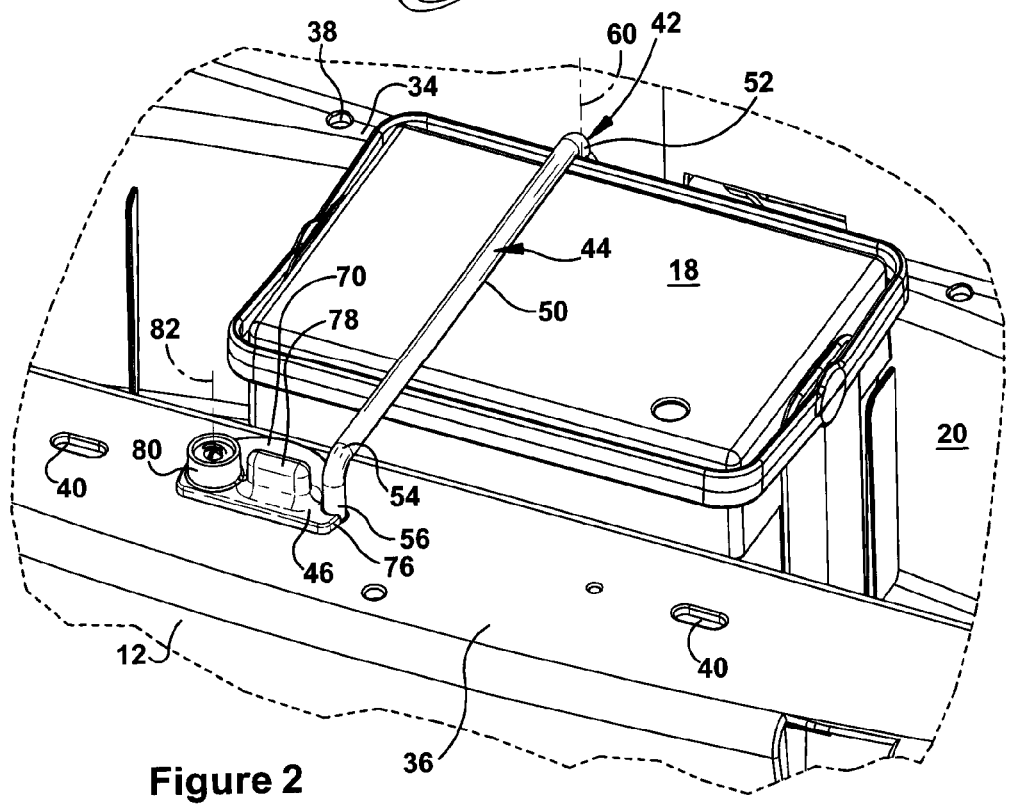
FIG. 2 is a close-up perspective view of the under-the-hood region of the vehicle, the battery retainer assembly being shown in a retaining condition.
Figure 3:
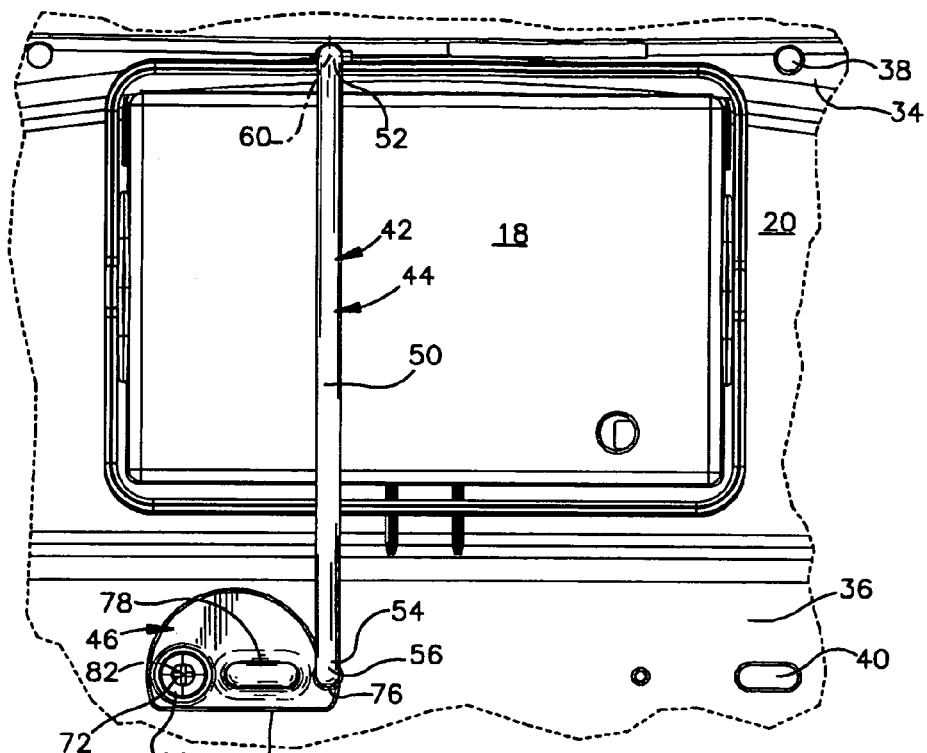
FIG. 3 is close-up top view of the under-the-hood region of the vehicle, the battery retainer assembly being shown in the retaining condition

Referring now to the drawings, and initially to FIG. 1, a child's riding vehicle 10 according to the present invention is shown. In the illustrated embodiment, the vehicle 10 is modeled to resemble an adult-drive off-road vehicle, namely a model of the Hummer® vehicles offered by General Motors Corporation. That being said, the vehicle 10 may take on any form adapted to simulate real vehicles in a reduced scale, such as, for example, a car, truck, jeep, bus, motorcycle, carriage, tractor, construction equipment, etc.

The child's riding vehicle 10 generally includes a body 12, wheels 14 rotatably coupled to the body 12, a motor drivingly coupled to the wheels 14, and a battery package 18 for powering the motor. In the illustrated embodiment, the battery package 18 has a rectangular-block-like shape and can be any type of suitable battery assembly such as, for example, one or more six-volt and/or twelve-volt rechargeable batteries. That being said, different shapes and/or other types of batteries may be used which have either the same or different voltages.

The vehicle 10 includes a storage location 20 for the battery package 18 which, in the illustrated embodiment, is located in a region of the vehicle body 12 which corresponds to the "under-the-hood-engine" region of an adult-size automobile. This region comprises a compartment 22 and a platform 24 surrounding the compartment 22. To clearly show the storage location 20 in FIG. 1, the vehicle 10 is illustrated without a hood covering the compartment 22 and the platform 24. Preferably, however, the vehicle body 12 would include a suitable hood that can be opened and closed over the compartment 22. Additionally or alternatively, the storage location 20 for the battery package 18 can be located in or on other regions of the vehicle 10.

The illustrated compartment 22 has a generally rectangular-block-like shape with a front-to-rear dimension only slightly greater than that of the battery package 18 and a lateral dimension about two times greater than that of the battery package 18. The storage location 20 is located in the lateral central region of the compartment 22 and vertical shelves can be provided to block lateral shifting of the battery package 18 within the compartment 22. Accordingly, the storage location 20 can be viewed as having a bottom wall on which the battery package 18 rests, a front edge and rear edge between which the battery package 18 is situated, and an open top through which the battery package 18 maybe inserted and withdrawn.

The platform 24 includes sections 34 and 36 adjacent the rear and front edges, respectively, of the storage location 20. The rear platform section 34 includes circular openings 38 and the front platform section 36 includes oval openings 40. One of the circular openings 38 is adjacent the storage location 20 and one of the oval openings 40 is longitudinally aligned with this opening 38 and also adjacent to the storage location 20.

The vehicle 10 further comprises a battery retainer assembly 42 for retaining the battery package 18 within the storage location 20. Specifically, for example, when the assembly 42 is in a retaining condition (as shown), it prevents the battery package 18 from being displaced and/or falling out of the compartment 22. The battery retainer assembly 42 is also preferably designed so that an adult can conveniently convert it to a released condition so that the battery package 18 is accessible and can be easily removed for recharging and/or replacement purposes.

Figure 4:
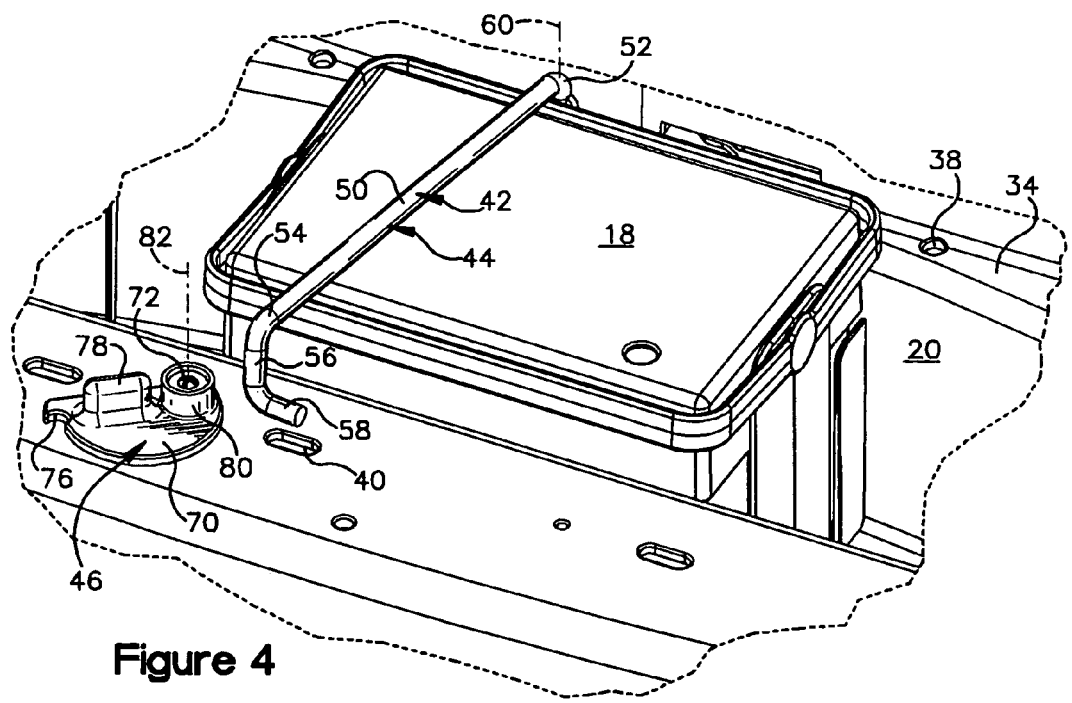
FIG. 4 is a close-up perspective view of the under-the-hood region of the vehicle, the battery retainer assembly being shown in a released condition.
Figure 5:
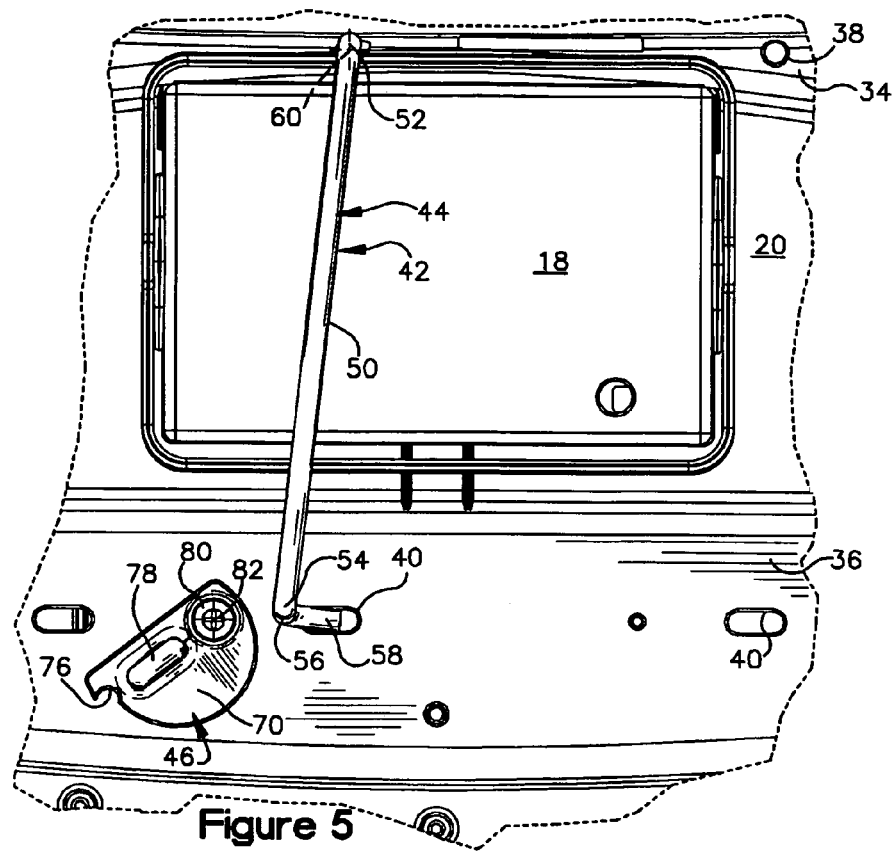
FIG. 5 is a close-up top view of the under-the-hood region of the vehicle, the battery retainer assembly being shown in the released condition.
Figure 6:
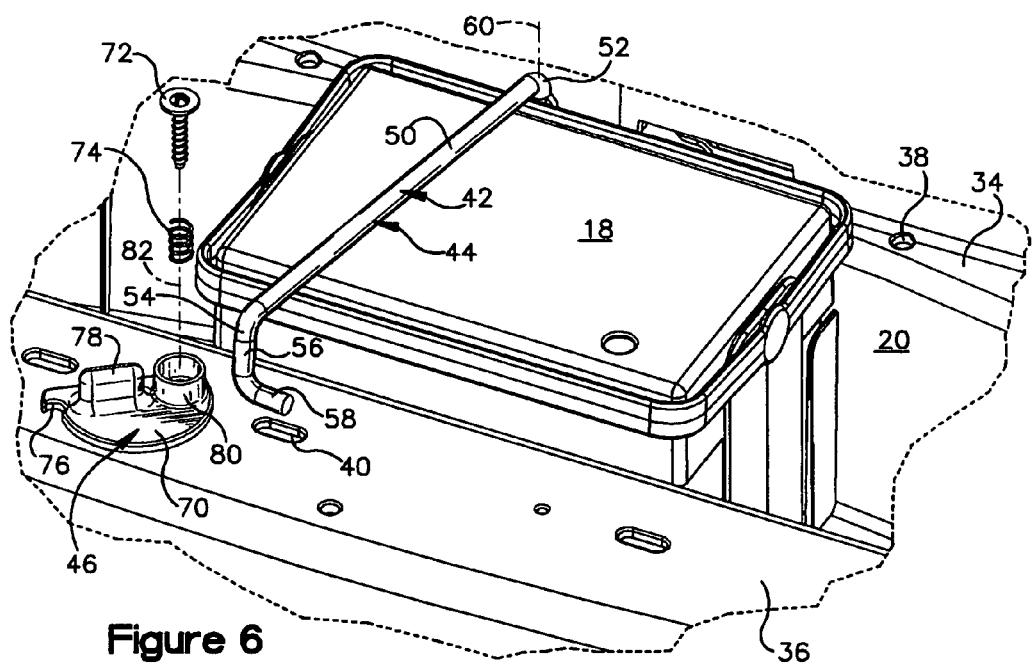
FIG. 6 is a close-up top view similar to FIG. 5, except that the components of a locking tab of the battery retainer assembly are shown in an exploded view.

Referring now to FIGS. 2-6 the battery retainer assembly 42 can be seen in more detail. The assembly 42 comprises a clamp 44 movable relative to the vehicle body 12 between a retaining condition whereat it retains the battery package 18 in the storage location 20 (FIGS. 2 and 3) and a released condition whereat it allows removal of the battery package 18 from the storage location 20 (FIGS. 4-6). The battery retainer assembly 42 further comprises a separate locking tab 46 movable relative to the vehicle body 12 between a locked position whereat it locks the clamp 44 in the retaining condition (FIGS. 2 and 3) and an unlocked position whereat it allows the clamp 44 to be moved to the released condition (FIGS. 4-6).

The clamp 44 has a rod-like structure comprising a central section 50, a rear section 52, and a front section 54. The central section 50 is sized to extend longitudinally across the storage location 20 (and the battery package 18) and to span the distance between the rear platform section 34 and the front platform section 36. The rear section 52 of the clamp 44 extends downward from the rear end of the central section 50. The front section 54 of the clamp 44 has an L-shape with a first leg portion 56 extending downward from the front end of the central section 50 and a second leg portion 58 extending substantially perpendicularly therefrom.

The rear section 52 of the clamp 44 is received within the adjacent circular opening 38 in the rear platform section 34. The rear section 52 defines a clamp-pivot axis 60 around with the clamp 44 can be pivoted relative to the vehicle body 12. Accordingly, the cross-sectional dimensions of the rear section 52 and the opening 38 should be such that the rear section 52 can be rotated therewithin without a significant amount of lateral or longitudinal shifting. The size/shape of these components should also allow up-down sliding of the rear clamp section 52 within the opening 38 along the axis 60. The vertical dimension of the rear section 52 can be great enough to accommodate the required sliding without withdrawal from the opening 38.

Regarding the front section 54 of the clamp 44, its second leg portion 58 is sized and shaped for selective insertion into the adjacent oval opening 40 in the front platform section 36. Specifically, when the leg portion 58 is aligned with the oval opening 40, it can be inserted therethrough. When the second leg portion 58 is inserted through the opening 40 and then moved out of alignment therewith, the front section 54 of the clamp 44 cannot be withdrawn from the opening 40.

Figure 7:
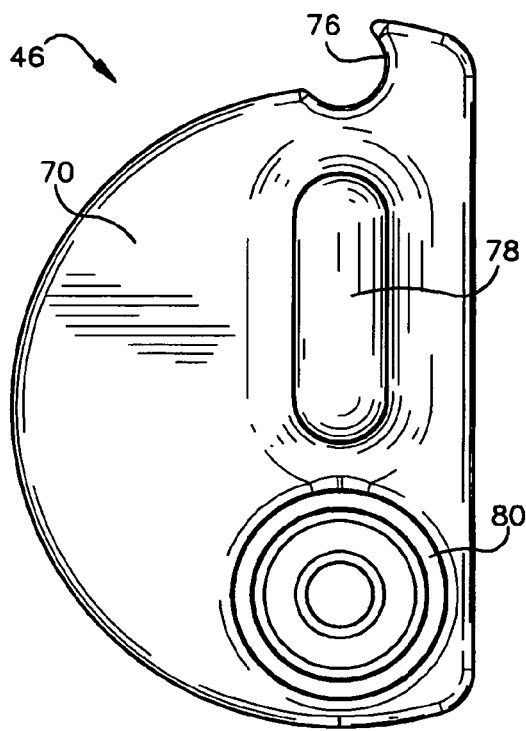
FIGS. 7, 8 and 9 are top, side, and front views, respectively, of a locking tab of the battery retainer assembly.
Figure 8:
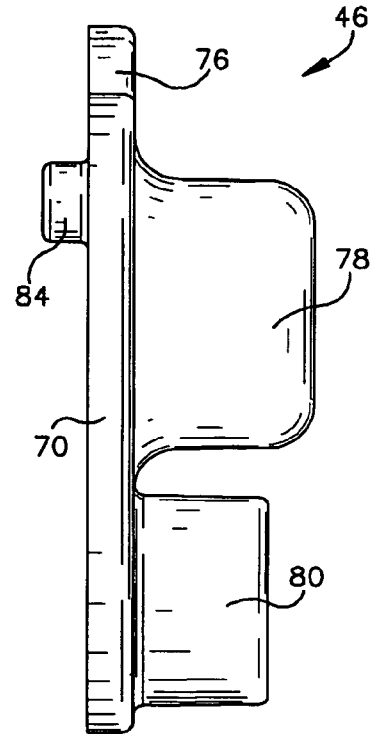
Figure 9:
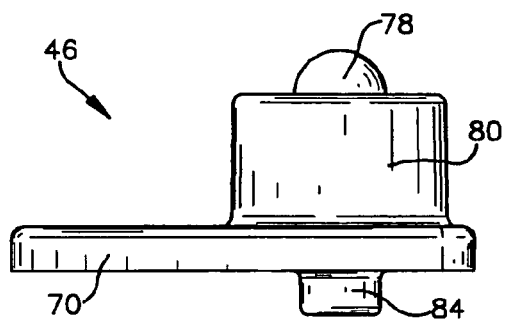

The locking tab 46 comprises a main plate 70, a lock screw 72, and a spring 74. (See FIG. 6.) As may be best seen by referring additionally to FIGS. 7-9, the main plate 70 has a roughly semi-circular shape with a notched shoulder 76 formed in along one diametric edge of this semi-circular shape. A gripping pedestal 78 and a cylindrical housing 80 extend upwardly from the main plate 70. A lower projection 84 extends downward from the main plate 70. The lock screw 72, with the spring 74 positioned therearound, is inserted into the cylindrical housing 80 and through an opening (not visible and/or numbered in the illustrated views) in the front platform section 36. A suitable nut or other catching component (also not visible and/or numbered in the illustrated views) is positioned below the platform section 36 for receipt of the distal end of the screw 72.

The spring/screw combination 72/74 defines an axis 82 about which the locking tab 46 can pivot to move between a locked position and an unlocked position. In the locked position, the notched shoulder 76 captures the first leg portion 56 of the front section 54 of the clamp 44 to hold the clamp 44 in the retaining condition. (See FIGS. 2 and 3.) In the unlocked position, the notched shoulder 76 is remote from the front section 54. (See FIGS. 4 and 5.) Loosening of the screw 72 allows movement of the tab 46 between the locked position and the unlocked position and tightening of the screw 72 holds the tab 46 in the locked position. Although not especially clear from the drawings, in the unlocked position, the plate 70 is tilted slightly relative to the platform section 34 to accommodate the lower projection 84.

When the clamp 44 is ready to be placed in the retaining condition, the vertical position of the rear section 52 within the opening 38 will be such that the leg portion 58 of the front section 54 is positioned above the front platform section 36. Also, the locking tab 46 will be in its unlocked position and its screw 72 will be loosened. (See FIGS. 4 and 5.) To place the clamp 44 in the retaining condition, the clamp 44 is pivoted about the axis 60 to align the leg portion 58 with the opening 40. The rear section 52 is then slid downwardly in the circular opening 38 to insert the leg portion 58 into the oval opening 40.

After insertion of the second leg portion 58 into the opening 40, the clamp 44 is pivoted in the projecting direction of the leg portion 58 to move it out of alignment with the oval opening 40 to thereby place the clamp 44 in its retaining condition. The locking tab 46 is then pivoted about its axis 82 to move to the locking tab 46 to its locking position whereat the notched shoulder 76 captures the first leg portion 56 of the front clamp section 54 and the lower projection 84 is inserted into the oval openings 40. (See FIGS. 2 and 3.) The grip pedestal 78 can be manually held to temporarily hold the locking tab 46 in the locked position until the screw 72 is tightened, thereby securing the tab 46 in this position. The battery package 18 is thereby retained in the storage location 20.

To release the battery package 18 for replacement or recharging purposes, the lock screw 72 is loosened and the locking tab 46 is lifted slightly and rotated about its axis 82. This results in the first leg portion 56 being released from the notched shoulder 76 and the projection 84 being withdrawn from the opening 40 and again resting on the platform section 34. The clamp 44 can then be lifted along and pivoted about its axis 60 to withdraw the leg portion 58 from the oval opening 40. In this released condition, the clamp 44 can be pivoted further in either direction until it clears the battery package 18 and/or the storage location 20. The battery package 18 can then be easily accessed and/or removed.

Alternatively, the spring/screw 72/74 can be such that movement of the locking tab 46 between the locked position and the unlocked position can be accomplished without loosening the screw 72. Specifically, the arrangement can be such that lifting of the main plate 70 (e.g., by the gripping pedestal 78), and the corresponding compression of the spring 72, allows such movement. In the unlocked position, the spring 72 biases the plate 70 towards the platform section 34, with the lower projection 84 causing the plate 70 again to be slightly tilted. In the locked position, the spring 72 biases the plate 70 towards the platform section 34, with the lower projection 84 being biased into the oval opening 40.

One may now appreciate that a battery retainer assembly 40 has been provided which adequately holds the battery package 18 in its storage location 20 while a child is driving the vehicle 10 while at the same time allowing convenient access and/or removal of the battery package 18 by a supervising adult. Although the invention has been shown and described with respect to certain preferred embodiments, it is evident that equivalent and obvious alterations and modifications will occur to others skilled in the art upon the reading and understanding of this specification.

The invention claimed is:

1. A child's riding vehicle comprising a vehicle body adapted to carry a child, wheels coupled to the vehicle body, a motor drivingly coupled to the wheels, a battery package for powering the motor, and a battery retainer assembly which retains the battery in a storage location on the vehicle body; the battery retainer assembly comprising:
    a clamp movable relative to the vehicle body between a clamped condition whereat it clamps the battery in the storage location and a released condition whereat it allows removal of the battery from the storage location; and
    a separate locking tab movable relative to the vehicle body between a locked position whereat it locks the clamp in the clamped condition and an unlocked position whereat it allows the clamp to be moved to the released condition;
    wherein the clamp has a first end section pivotally coupled to the vehicle body and a second end section;
    wherein, when the clamp is in its clamped condition and the locking tab is in its locked position, the locking tab captures the second end section of the clamp to hold the clamp in the clamped condition.

2. A child's riding vehicle as set forth in claim 1, wherein the clamp is pivotal relative to the vehicle body about a clamp-pivot axis and wherein the locking tab is pivotal relative to the vehicle body about a separate lock-pivot axis.

3. A child's riding vehicle as set forth in claim 2, wherein the clamp is also slidable relative to the vehicle body along the clamp-pivot axis.

4. A child's riding vehicle as set forth in claim 1, wherein the second end section is insertable into an opening in the vehicle body to place the clamp in the clamped condition.

5. A child's riding vehicle as set forth in claim 4, wherein the second end section of the clamp includes a portion insertable through the opening in the vehicle body when aligned therewith and non-withdrawable through the opening in the vehicle body when not aligned therewith.

6. A child's riding vehicle as set forth in claim 5, wherein the insertable portion of the clamp is inserted through the opening and non-aligned with the opening in the vehicle body when the clamp is in the clamped condition.

7. A child's riding vehicle as set forth in claim 6, wherein the clamp has a rod-like structure comprising a central section sized to extend across the storage location, the first end section pivotally coupled to the vehicle body, and the second end section which is the insertable section of the clamp.

8. A child's riding vehicle as set forth in claim 7, wherein the locking tab includes a notched shoulder which, when the locking tab is in the locked position, captures the second end section of the clamp to hold the clamp in the clamped condition.

9. A child's riding vehicle as set forth in claim 8, wherein the locking tab includes a lower projection which, when the locking tab is moved to the locked position, is inserted into the opening in the vehicle body.

10. A child's riding vehicle as set forth in claim 1, wherein the clamp has a rod-like structure comprising a central section sized to extend across the storage location, the first end section pivotally coupled to the vehicle body, and the second end section, wherein the second end section is insertable into an opening in the vehicle body.

11. A child's riding vehicle as set forth in claim 1, wherein the locking tab includes a notched shoulder which, when the locking tab is in the locked position, captures a section of the clamp to hold the clamp in the clamped condition.

12. A child's riding vehicle as set forth in claim 11, wherein the locking tab is pivotal about a pivot axis to move the notched shoulder into and out of engagement with the section of the clamp.

13. A child's riding vehicle as set forth in claim 12, wherein the locking tab includes a lower projection which, when inserted in an opening in the vehicle body, holds the locking tab in the locked position.

14. A child's riding vehicle as set forth in claim 13, wherein the locking tab includes a gripping pedestal for lifting the locking tab when moving it between the locked position and the unlocked position.

15. A child's riding vehicle as set forth in claim 1, wherein the storage location is located in a region of the vehicle body corresponding to the under-the-hood region of an adult-size vehicle.

16. A child's riding vehicle as set forth in claim 15, wherein the region comprises a compartment and wherein the storage location comprises at least a portion of the compartment.

17. A method of removing the battery from the riding vehicle set forth in claim 1, said method comprising the steps of:
    moving the locking tab to its unlocked position;
    moving the clamp, while the locking tab in its unlocked position, to the released condition;
    removing the battery from the storage location.

18. A method of installing the battery in the riding vehicle set forth in claim 1, said method comprising the steps of:
    placing the battery in the storage location while the clamp is in its released condition;
    moving the clamp to its clamped condition; and
    moving the locking tab to its locked position to lock the clamp in its clamped condition.

19. A child's riding vehicle comprising a vehicle body adapted to carry a child, wheels coupled to the vehicle body, a motor drivingly coupled to the wheels, a battery package for powering the motor, and a battery retainer assembly which retains the battery in a storage location on the vehicle body; the battery retainer assembly comprising a clamp and a separate locking tab;

the storage location being located in a compartment in a region of the vehicle body corresponding to the under-the-hood region of an adult-size vehicle;

the clamp being movable relative to the vehicle body between a clamped condition whereat it clamps the battery in the storage location and a released condition whereat it allows removal of the battery from the storage location;

the clamp having a rod-like structure comprising a central section sized to extend across the storage location, a first end section pivotally coupled to the vehicle body about a clamp-pivot axis, and a second end section insertable through an opening in the vehicle body when aligned therewith and non-withdrawable through the opening in the vehicle body when not aligned therewith, the second end section being inserted through the opening and non-aligned with the opening in the vehicle body when the clamp is in the clamped condition;

the locking tab being pivotal about a locking-pivot axis to move relative to the vehicle body between a locked position whereat it locks the clamp in the clamped condition and an unlocked position whereat it allows the clamp to be moved to the released condition; and the locking tab having a notched shoulder which, when the clamp is in the clamped condition and the locking tab is in the locked position, captures the second end section of the clamp.

20. A child's riding vehicle as set forth in claim 19, wherein the locking tab includes a projection which, when the locking tab is in the locked position, is positioned within the opening in the vehicle body.

* * * * *